(12) United States Patent
Dutta et al.

(10) Patent No.: US 10,785,686 B2
(45) Date of Patent: Sep. 22, 2020

(54) DEVICES, SYSTEMS, AND METHODS FOR CHANNEL ACCESS IN DYNAMIC SPECTRUM SHARING

(71) Applicant: ATC Technologies, LLC, Reston, VA (US)

(72) Inventors: Santanu Dutta, Vienna, VA (US); Dunmin Zheng, Vienna, VA (US)

(73) Assignee: ATC TECHNOLOGIES, LLC, Reston, VA (US)

( * ) Notice: Subject to any disclaimer, the term of this patent is extended or adjusted under 35 U.S.C. 154(b) by 0 days.

(21) Appl. No.: 15/995,788

(22) Filed: Jun. 1, 2018

(65) Prior Publication Data

US 2018/0352479 A1 Dec. 6, 2018

Related U.S. Application Data

(60) Provisional application No. 62/514,512, filed on Jun. 2, 2017, provisional application No. 62/623,722, filed on Jan. 30, 2018.

(51) Int. Cl.
| | |
|---|---|
| *H04W 28/26* | (2009.01) |
| *H04W 88/16* | (2009.01) |
| *H04W 16/10* | (2009.01) |
| *H04W 16/14* | (2009.01) |
| *G06N 20/00* | (2019.01) |
| *H04W 16/02* | (2009.01) |

(52) U.S. Cl.
CPC .......... *H04W 28/26* (2013.01); *H04W 16/10* (2013.01); *H04W 16/14* (2013.01); *H04W 88/16* (2013.01); *G06N 20/00* (2019.01); *H04W 16/02* (2013.01)

(58) Field of Classification Search
CPC ..... H04W 28/26; H04W 88/16; H04W 16/02; H04W 16/14; H04W 16/10; G06N 20/00
USPC ........................................................ 370/329
See application file for complete search history.

(56) References Cited

U.S. PATENT DOCUMENTS

| | | | | |
|---|---|---|---|---|
| 8,170,048 B1* | 5/2012 | Gossett | .................. | G06Q 40/04 370/447 |
| 8,199,768 B1* | 6/2012 | Gossett | .................. | G06Q 40/04 370/447 |

(Continued)

OTHER PUBLICATIONS

PCT/US2018/035631 International Search Report and Written Opinion dated Aug. 29, 2018 (12 pages).

*Primary Examiner* — Man U Phan
(74) *Attorney, Agent, or Firm* — Michael Best & Friedrich LLP

(57) ABSTRACT

Devices, systems, and methods for channel access in dynamic spectrum sharing. In one embodiment, a server includes a communication interface, a memory, and an electronic processor configured to receive an allotment of bidding credits, determine an amount of available spectrum, generate a power spectrum matrix, generate a bid based on a need for spectrum access and a portion of the allotment of bidding credits, control the communication interface to transmit the power spectrum matrix and the bid to the one or more servers, receive an external power spectrum matrix and an associated bid from each of the one or more servers, compare the bid to the associated bid to determine a winning bid, and control all of the one or more radio nodes to use the spectrum that is associated with the power spectrum matrix in response to determining that the bid is the winning bid.

19 Claims, 4 Drawing Sheets

(56) References Cited

U.S. PATENT DOCUMENTS

| | | | | |
|---|---|---|---|---|
| 8,537,851 B1* | 9/2013 | Gossett | ................ | G06Q 40/04 |
| | | | | 370/447 |
| 8,780,882 B2* | 7/2014 | Hu | ................ | H04W 16/14 |
| | | | | 370/230 |
| 9,681,307 B2* | 6/2017 | Taher | ................ | H04W 16/14 |
| 9,756,529 B2* | 9/2017 | Buddhikot | ............ | H04W 16/14 |
| 9,832,653 B2* | 11/2017 | Smith | ................ | H04W 16/14 |
| 10,111,243 B2* | 10/2018 | Mitola, III | ............ | G06Q 30/08 |
| 10,165,450 B2* | 12/2018 | Taher | ................ | H04W 16/14 |
| 2009/0161614 A1 | 6/2009 | Grandblaise et al. | | |
| 2015/0003238 A1* | 1/2015 | Kalmikov | ......... | H04W 28/0289 |
| | | | | 370/230 |
| 2015/0245374 A1 | 8/2015 | Mitola, III et al. | | |
| 2016/0066214 A1 | 3/2016 | Buddhikot et al. | | |
| 2018/0184302 A1* | 6/2018 | Zhang | ............. | H04W 74/0816 |
| 2019/0132853 A1* | 5/2019 | Mitola, III | ............ | G06Q 30/08 |

\* cited by examiner

- GRN Server 100

| Subband | 1 | 2 | 3 | ... | 80 |
|---|---|---|---|---|---|
| RN_100_1 | P100_1_1 | P100_1_2 | | | P100_1_80 |
| RN_100_2 | | P100_2_2 | | | |
| RN_100_M | | P100_M_2 | P100_M_3 | | P100_M_80 |

- GRN Server 200

| Subband | 1 | 2 | 3 | ... | 80 |
|---|---|---|---|---|---|
| RN_200_1 | P200_2_1 | P200_2_2 | | | |
| RN_200_2 | | | | | |
| RN_200_M | P200_M_1 | | | | P200_M_80 |

DEVICES, SYSTEMS, AND METHODS FOR CHANNEL ACCESS IN DYNAMIC SPECTRUM SHARING

CROSS-REFERENCE TO RELATED APPLICATIONS

This application claims the benefit of U.S. Provisional Patent Application No. 62/514,512, filed on Jun. 2, 2017, and claims the benefit of U.S. Provisional Patent Application No. 62/623,722, filed on Jan. 30, 2018, the entire contents of which are hereby incorporated by reference.

FIELD OF INVENTION

The present disclosure relates generally to wireless communication systems. More specifically, the present disclosure relates to resource allocation between wireless communication networks that share spectrum in a wireless communication system.

BACKGROUND

For conventional wireless networks, the frequency band that a wireless network utilizes is determined via an allocation by the Federal Communications Commission (FCC). Conventionally, when a wireless network is communicating over long distances, another wireless network is not authorized to communicate over the same frequency band in the region. Due to variability in traffic demand in most wireless networks, spectrum usage varies in efficiency over time.

SUMMARY

One exemplary embodiment is to allow each operator (for example, each server) unrestrained channel access, while all operators try to figure out what the other operators are going to do next, and generate spectrum occupancy plans to avoid collisions. It is understood that machine learning may help predict the next steps of each operator but it is still predicting something that is imperfectly known and subject to stochastic variations.

Another exemplary embodiment is to improve net spectrum utilization by allocating channel resources in a globally optimal manner that considers the short term needs of all operators dynamically without forcing all operators to share a common RAN Scheduler. Specifically, each operator bids for channel resources every T-seconds (where T has a fixed value agreed to by all operators) using a finite pool of bidding credits which is given to each operator at the beginning.

To conserve credits, an operator may bid according to the average latency tolerance of the messages that are in the input queues of all the radio nodes in the wireless network provided by the operator. Assuming that the average latency tolerance of the messages may vary randomly from one T-second epoch to another, the operator may use machine learning to generate an appropriate bid.

Once the bidding for a given epoch has concluded, all uncertainty about the spectrum occupancies of each operator is eliminated. A new round of bidding will occur for the next epoch.

The bidding occurs via the wired collaboration channel and does not tax the radio channels. The bidding for the next epoch can start as soon as a given epoch starts. For example, in one embodiment, the present disclosure includes a wireless communication system. The wireless communication system includes a first server and a second server. The first server providing a first wireless network with one or more first radio nodes. The second server providing a second wireless network with one or more second radio nodes, the second wireless network using the same spectrum as the first wireless network, the second server communicatively connected to the first server. The first server includes a memory and an electronic processor. The electronic processor is communicatively connected to the memory and configured to perform a bidding process, receive an assigned power spectrum density matrix based on the bidding process, and control the one or more first radio nodes based on the assigned power spectrum density matrix.

For example, in one embodiment, a server of the present disclosure includes a communication interface, a memory, and an electronic processor communicatively connected to the memory. The communication interface is configured to communicate with one or more servers via a backchannel, and control a terrestrial antenna to communicate with one or more radio nodes that form a wireless network. The electronic processor is configured to receive an allotment of bidding credits, determine an amount of available spectrum, generate a power spectrum matrix based on the amount of available spectrum that is determined, the power spectrum matrix being an aggregate of spectrum needs for all of the one or more radio nodes, generate a bid based on a need for spectrum access and a portion of the allotment of bidding credits, control the communication interface to transmit the power spectrum matrix that is generated and the bid that is generated to the one or more servers, receive an external power spectrum matrix and an associated bid from each of the one or more servers, compare the bid that is generated to the associated bid that is received from the each of the one or more servers to determine whether the bid that is generated is a winning bid, and control all of the one or more radio nodes to use the spectrum that is associated with the power spectrum matrix in response to determining that the bid that is generated is the winning bid.

In another embodiment, a wireless communication system of the present disclosure includes a first one or more radio nodes configured to form first wireless network, a second one or more radio nodes configured to form a second wireless network sharing the same spectrum as the first wireless network, a first server configured to control the first one or more radio nodes, and a second server configured to control the second one or more radio nodes. The first server includes a communication interface, a memory, and an electronic processor communicatively connected to the memory. The communication interface is configured to communicate with one or more servers via a backchannel, the one or more servers including the second server, and control a terrestrial antenna to communicate with the first one or more radio nodes. The electronic processor is configured to receive an allotment of bidding credits, determine a first amount of available spectrum, generate a power spectrum matrix based on the first amount of available spectrum that is determined, the power spectrum matrix being an aggregate of spectrum needs for all of the first one or more radio nodes, generate a bid based on a need for spectrum access and a portion of the allotment of bidding credits, control the communication interface to transmit the power spectrum matrix that is generated and the bid that is generated to the one or more servers, receive an external power spectrum matrix and an associated bid from each of the one or more servers, compare the bid that is generated to the associated bid that is received from the each of the one or more servers to determine whether the bid that is generated is a winning bid, and control all of the first one or more radio nodes to use the spectrum that is associated with the power spectrum matrix in response to determining that the bid that is generated is the winning bid.

In yet another embodiment, a method of the present disclosure is for operating a server to control one or more radio nodes to broadcast information over shared spectrum in a bidding environment. The method includes receiving, with an electronic processor of the server, an allotment of bidding credits, determining, with the electronic processor, an amount of available spectrum, generating, with the electronic processor, a power spectrum matrix based on the amount of available spectrum that is determined, the power spectrum matrix being an aggregate of spectrum needs for all of the one or more radio nodes, generating, with the electronic processor, a bid based on a need for spectrum access and a portion of the allotment of bidding credits, controlling, with the electronic processor, a communication interface to transmit the power spectrum matrix that is generated and the bid that is generated to the one or more servers, receiving, with the electronic processor, an external power spectrum matrix and an associated bid from each of the one or more servers, comparing, with the electronic processor, the bid that is generated to the associated bid that is received from the each of the one or more servers to determine whether the bid that is generated is a winning bid, and controlling, with the electronic processor, all of the one or more radio nodes to use the spectrum that is associated with the power spectrum matrix in response to determining that the bid that is generated is the winning bid.

BRIEF DESCRIPTION OF THE DRAWINGS

FIG. 2 is a diagram illustrating power spectrum matrices of a bidding environment.

DETAILED DESCRIPTION OF EXEMPLARY EMBODIMENTS

Before any embodiments of the present disclosure are explained in detail, it is to be understood that the present disclosure is not limited in its application to the details of construction and the arrangement of components set forth in the following description or illustrated in the following drawings. The present disclosure is capable of other embodiments and of being practiced or of being carried out in various ways.

Figure 1:
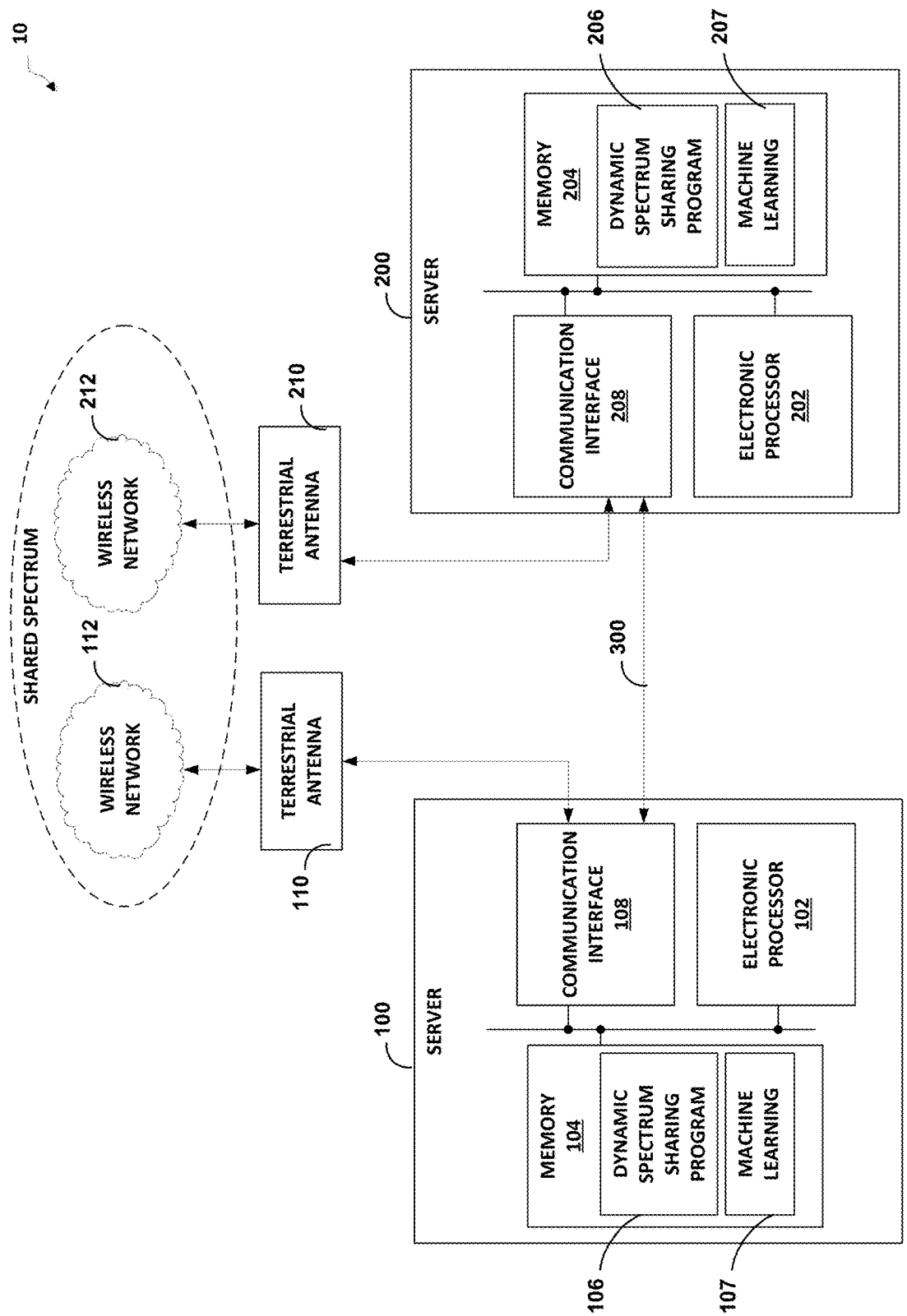
FIG. 1 is a block diagram illustrating a wireless communication system including two servers, each server controlling one or more radio nodes to provide two wireless networks that share spectrum with each other.

FIG. 1 is a block diagram illustrating a wireless communication system 10 including two servers, each server controlling one or more radio nodes to provide two wireless networks that share spectrum with each other. It should be understood that, in some embodiments, there may be more than two servers in configurations different from that illustrated in FIG. 1. The functionality described herein may be extended to any number of servers providing any number of wireless networks that share spectrum with each other.

In the example of FIG. 1, the server 100 includes an electronic processor 102 (for example, a microprocessor or another suitable processing device), a memory 104 (for example, a non-transitory computer-readable storage medium), and a communication interface 108. It should be understood that, in some embodiments, the server 100 may include fewer or additional components in configurations different from that illustrated in FIG. 1. Also the server 100 may perform additional functionality than the functionality described herein. In addition, the functionality of the server 100 may be incorporated into other servers, radio nodes of the server 100, or other suitable processing devices. As illustrated in FIG. 1, the electronic processor 102, the memory 104, and the communication interface 108 are electrically coupled by one or more control or data buses enabling communication between the components.

The memory 104 may include a program storage area (for example, read only memory (ROM)) and a data storage area (for example, random access memory (RAM), and other non-transitory, machine-readable medium). In some examples, the program storage area may store the instructions regarding a dynamic spectrum sharing program 106 as described in greater detail below and a machine learning function 107.

The electronic processor 102 executes machine-readable instructions stored in the memory 104. For example, the electronic processor 102 may execute instructions stored in the memory 104 to perform the dynamic spectrum sharing program 106 and/or the machine learning function 107.

Machine learning generally refers to the ability of a computer program to learn without being explicitly programmed. In some embodiments, a computer program (for example, a learning engine) is configured to construct an algorithm based on inputs. Supervised learning involves presenting a computer program with example inputs and their desired outputs. The computer program is configured to learn a general rule that maps the inputs to the outputs from the training data it receives. Example machine learning engines include decision tree learning, association rule learning, artificial neural networks, classifiers, inductive logic programming, support vector machines, clustering, Bayesian networks, reinforcement learning, representation learning, similarity and metric learning, sparse dictionary learning, and genetic algorithms. Using one or more of the approaches described above, a computer program can ingest, parse, and understand data and progressively refine algorithms for data analytics.

The communication interface 108 receives data from and provides data to devices external to the server 100, such as the terrestrial antenna 114 and, when the server 100 is part of a gateway radio node (GRN), the second server 200, and one or more radio nodes. For example, the communication interface 108 may include a port or connection for receiving a wired connection (for example, an Ethernet cable, fiber optic cable, a telephone cable, or the like), a wireless transceiver, or a combination thereof. The wireless network 112 includes one or more radio nodes (not shown) that transmit information via the wireless network 112.

In the example of FIG. 1, the second server 200 includes an electronic processor 202 (for example, a microprocessor or another suitable processing device), a memory 204 (for example, a non-transitory computer-readable storage medium), and a communication interface 208. It should be understood that, in some embodiments, the second server 200 may include fewer or additional components in configurations different from that illustrated in FIG. 1. Also the second server 200 may perform additional functionality than the functionality described herein. In addition, the functionality of the second server 200 may be incorporated into other servers, radio nodes of the server 200, or other suitable processing devices. As illustrated in FIG. 1, the electronic processor 202, the memory 204, and the communication interface 208 are electrically coupled by one or more control or data buses enabling communication between the components.

The memory 204 may include a program storage area (for example, read only memory (ROM)) and a data storage area (for example, random access memory (RAM), and other non-transitory, machine-readable medium). In some examples, the program storage area may store the instructions regarding a dynamic spectrum sharing program 206 as described in greater detail below and a machine learning function 207.

The electronic processor 202 executes machine-readable instructions stored in the memory 204. For example, the electronic processor 202 may execute instructions stored in the memory 204 to perform the functionality described in greater detail below.

The communication interface 208 receives data from and provides data to devices external to the second server 200, such as the terrestrial antennas 210 and, when the server 200 is part of a GRN, the server 100, and one or more radio nodes. For example, the communication interface 208 may include a port or connection for receiving a wired connection (for example, an Ethernet cable, fiber optic cable, a telephone cable, or the like), a wireless transceiver, or a combination thereof. In the example of FIG. 1, the communication interface 208 is communicatively connected to the communication interface 108 via a backchannel 300 for collaboration and coordination of servers 100 and 200. The wireless network 212 includes one or more radio nodes (not shown) that transmit information via the wireless network 212.

In some examples, the servers 100 and 200 may include one or more optional user interfaces (not shown). The one or more optional user interfaces include one or more input mechanisms (for example, a touch screen, a keypad, a button, a knob, and the like), one or more output mechanisms (for example, a display, a printer, a speaker, and the like), or a combination thereof. The one or more optional user interfaces receive input from a user, provide output to a user, or a combination thereof. In some embodiments, as an alternative to or in addition to managing inputs and outputs through the one or more optional user interfaces, the servers 100 and 200 may receive user input, provide user output, or both by communicating with an external device, such as a console computer, over a wired or wireless connection (for example, through the communication interfaces 108 and/or 208).

In some embodiments, the dynamic spectrum sharing programs 106 and 206 are each respectively defined by the following:

Bidding Technique

[Bidding Environment]

N servers, which are part of N gateway radio nodes (GRNs). Each of the N servers monitor and control a total of M radio nodes, including the GRNs, for a total of N*M radio nodes. For example, assuming the available shared spectrum is 80 MHz, is subdivided into 80 1-MHz sub-bands (80 is just an example; the exact number may be negotiated and agreed upon between the servers).

Every T seconds (i.e., an epoch duration), the N servers negotiate and agree among themselves on the amount of power spectrum density (PSD) each of its M radio nodes is going to put on each of the 80 sub-bands. At the end of the negotiation, each server agrees to a matrix of maximum PSD values, as illustrated in FIG. 2 below. A radio node may transmit power less than its assignment. The value of T is also agreed upon among the servers. In some embodiments, T may be the average interval of an external controller sending message transfer requests to the servers' radio nodes.

[Bidding Process]

A bidding process requires a broadcast (one-to-all) channel (via the wired backbone network connecting the servers) so that every server can see the bid of every other server. Alternatively, $N^2$ unicast messages may be used among the N GRNs to replicate N broadcast messages. However, it is assumed that a broadcast channel (real or virtual) exists among the servers, and that a true bidding process can be executed among the N servers.

In a conventional auction, bidders bid with money. An example of how a server uses its bidding credits to optimize its spectrum access over an Epoch is described below. For example, if a server has low-latency-tolerant data to send (i.e., a high load), such as voice or video, the server would try to buy access priority by spending more credits. Conversely, if the server does not have low-latency-tolerant data to send (i.e., a low load), the server would spend less and save the credits. The machine learning (e.g., the machine learning function 107) of the server generates the bid based on a number of different factors that are related to a need for spectrum access including the load of the server, any known spectrum interference pattern at the receiver node of a link, a load of a transmitting node, a range between a transmitter and a receiver, a pathloss associated with the range, a capacity of the radio link, a need to protect other users of the spectrum, or other factors affecting the need for spectrum.

The highest bidder among the servers is assigned the exact PSD matrix requested in the bid. The next round of bidding involves the remaining servers, who contend over spectral bins not occupied by the highest bidder. The remaining servers may use machine learning to generate lower level bids that do not interfere (as per agreed interference criteria) with the spectral bins won in higher level bids.

The bids for the second round may be different from the first round as the machine learning of each server may have a different preferred PSD matrix based on the PSD matrix declared by higher level bidders.

The bidding process continues sequentially until all servers have an assigned PSD matrix. Once the bidding for a given epoch is complete, every server knows exactly the PSD matrix of every radio node. Thereafter, the servers do not need to use machine learning or other advanced techniques to predict the PSD matrix of every radio node during the Epoch linked to the spectrum auction.

The lower the bidding status of a server, the greater would be the divergence between the most desired PSD matrix of that server and its assigned PSD matrix. Aiming for a low bidding status, and thereby saving bidding credits, may be strategically advantageous when most of the messages to be transported by that server's radio nodes, during the upcoming epoch, have high latency tolerance.

The radio nodes may not actually transmit at the full assigned PSD in a spectral bin but the radio nodes may not exceed the assigned limit. The machine learning of the server may choose the modulation and forward error correction coding (mod/code) for each radio node in its network according to the assigned PSD limits for that radio node.

In other embodiments, the dynamic spectrum sharing programs 106 and 206 are each defined by the following:

Reverse Auction Technique

In a reverse auction, also referred to as "Dutch auction", an entity controlling access to the spectrum, referred to as the incumbent server, places the first selling bid, which is the price at which the incumbent server is willing to sell access rights to designated segments of the spectrum. If none of the other servers bid, the incumbent server may reduce the bid or not sell the spectrum. A server bids when the price falls to a level it finds acceptable. The first server to bid gets the spectrum segments it bids on. These may comprise a subset of the spectrum segments on sale. The sale may continue for the remainder of the spectrum segments in successive rounds of bidding at increasingly lower prices, until the incumbent selects not to drop price further. An advantage of the reverse auction technique is that the spectrum may be priced dynamically based on demand. It may be used by the incumbent server to generate revenue from temporarily unutilized spectrum, while reserving highest access priority for its own use.

In yet other embodiments, the dynamic spectrum sharing programs 106 and 206 are each defined by the following:

Round Robin Technique

Another technique is to allow each server to have highest bidding priority in a round robin manner. If there are 5 servers, each server would have the highest priority once every 5 bidding epochs. The round robin technique offers fewer options to the servers and is less taxing on the machine learning.

[Advantages]

As every server knows the expected worst spectrum occupancy profiles of all the other servers for the upcoming epoch, there is no need for the machine learning of each server to guess what the other servers are going to do next. The machine learning of each server may focus on generating an appropriate bid during the auctions, which may occur in the background for epoch (j+1) as data transfer is in progress while epoch (j) is in progress.

The techniques described above are described individually. However, the techniques described above may also be used in various combinations with each other.

FIG. 2 is a diagram 400 illustrating one example of power spectrum matrices of a bidding environment at the opening of a spectrum auction. During an opening bid of the spectrum auction, different GRN servers may be bidding for the same sub-band. After the sub-band is auctioned off to the highest bidder, the auctioned sub-band cannot be subject to bidding by other GRN servers.

The diagram 400 includes an example of power spectrum matrices of the bidding environment at the opening of the spectrum auction for GRN server 100 and GRN server 200. The GRN server 100 bids for the 80 sub-bands for radio nodes RN_100_1 through RN_100_M and GRN server 200 bids for the 80 sub-bands for radio nodes RN_200_1 through RN_200_M.

In the example of FIG. 2, with respect to radio node RN_100_1, the GRN server 100 bids for sub-bands 1, 2, and 80 (designated as P100_1_1, P100_1_2, and P100_1_80, respectively) out of the 80 sub-bands. With respect to radio node RN_100_2, the GRN server 100 bids for sub-band 2 (designated as P100_2_2) out of the 80 sub-bands. With respect to radio node RN_100_M, the GRN server 100 bids for sub-bands 2, 3, and 80 (designated as P100_M_2, P100_M_3, and P100_M_80, respectively) out of the 80 sub-bands. These bids by the GRN servers 100 and 200 represent the aggregate spectrum requirements of all radio nodes under the control of each GRN (noting that the optimal spectrum requirements for different node-to-node wireless links may be different).

Additionally, in the example of FIG. 2, with respect to radio node RN_200_1, the GRN server 200 does not bid for any of the 80 sub-bands, possibly because it does not have an immediate need for low latency transmission relative to radio node RN_200_1, and therefore the GRN server 200 is choosing to "no bid" the present bidding round for any spectrum specifically for that radio node. The GRN server 200 may bid for spectrum for that radio node in a subsequent round. With respect to radio node RN_200_2, the GRN server 200 bids for sub-bands 1 and 2 (designated as P200_2_1 and P200_2_2, respectively) out of the 80 sub-bands. With respect to radio node RN_200_M, the GRN server 200 bids for sub-bands 1 and 80 (designated as P200_M_1 and P200_M_80, respectively) out of the 80 sub-bands.

It should be noted that, in a bid, a server logically aggregates the spectrum needs of all radio nodes under the control of the server, using for each spectrum bin, or sub-band, the highest value of all entries in a given column. In the example of FIG. 2, the GRN Server 100 bids the following: {Sub-band 1, P100_1_1}, {Sub-band 2, Max{P100_1_2, P100_2_2, P100_M_3}, {Sub-band 80, Max{P100_1_80, P100_M_80}. All sub-bands with no entries are considered, 'no bid' for that bidding round. If the bid by the GRN server 100 is successful, the GRN server 100 is free to assign the sub-bands that are won to the radio nodes under the control of the GRN server 100 and according to the discretion of the GRN server 100. The discretion of the GRN server 100 includes reusing the sub-bands that are won at suitably dispersed geographical locations.

Depending on the credits bid by the GRN server 100 and the GRN server 200, one of radio nodes RN_100_1, RN_200_2, and RN_200_M will receive the right to broadcast on sub-band 1. However, if there is a tie among the credits bid by the above three radio nodes, the bidding round may be repeated. To prevent a deadlock, an immediately following second tie may be resolved by picking a winner randomly.

It is known that, in terrestrial cellular networks, the same frequency may be reused at locations separated by some minimum distance. The frequency reuse may be intra-network or inter-network. In the present application, sharing between networks is the subject of primary interest. Therefore, the auction process described above is made specific to a particular geographical location, with parallel bidding for the same spectrum centered on locations separated by a minimum separation distance, which would depend on morphology, radio frequency and desired cell type (macro, small or micro). For example, in so called "midband spectrum" such as 1.5 GHz, for macrocells, the separation distance may vary between 3 and 5 km for urban morphologies, assuming a margin over the nominal 1.5 km cell radius for macrocells at this frequency and morphology. For rural morphologies at the same radio frequency and macrocells, the separation distance may be approximately 10 km.

In the example of FIG. 2, assuming the GRN server 100 and the GRN server 200 and their associated radio nodes are separated from each other by more than a predetermined distance, then radio nodes RN_100_1, RN_200_2, and radio node RN_200_M may all receive the right to broadcast on sub-band 1 (if the spectrum masks shown FIG. 2 are winning bids in each of their respective geographies).

Figure 3:
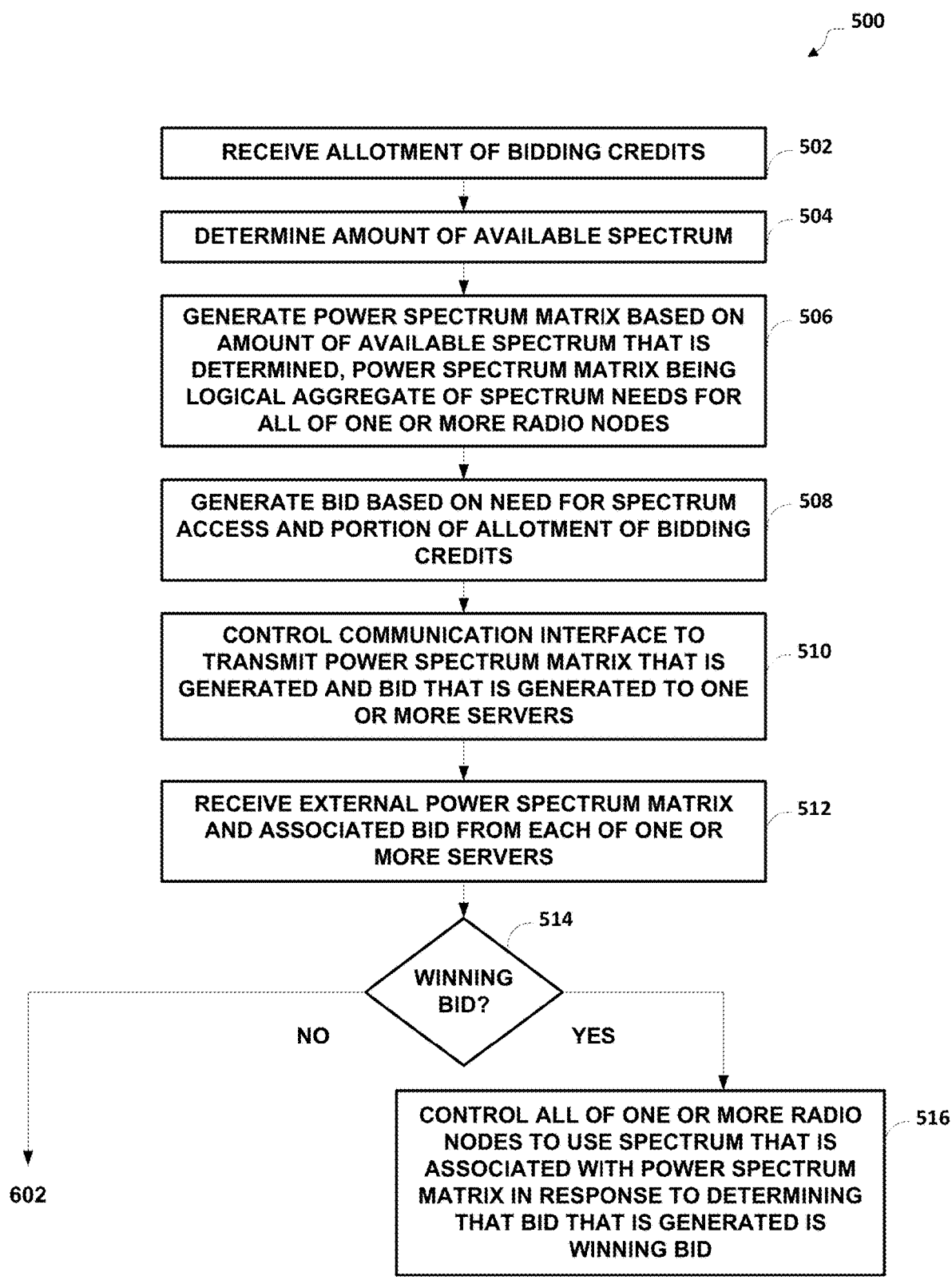
FIG. 3 is a flowchart illustrating a method for operating a server to control one or more radio nodes.

FIG. 3 is a flowchart illustrating a method 500 for operating a server to control one or more radio nodes. For ease of understanding, the method 500 is described with respect to the GRN server 100 of the wireless communication system 10 of FIG. 1 and FIG. 2. However, the method 500 is equally applicable to the GRN server 200 of FIG. 1 or any other additional servers of the wireless communication system 10.

With respect to FIG. 3, the method 500 includes receiving, with an electronic processor of the server, an allotment of bidding credits (at block 502). For example, the electronic processor 102 receives the allotment of bidding credits via the communication interface 108 and the backchannel 300. Alternatively, in some examples, the electronic processor 102 generates the allotment of bidding credits corresponding to a predetermined or agreed upon number.

The method 500 includes determining, with the electronic processor, an amount of available spectrum (at block 504). For example, the electronic processor 102 determines whether any spectral bins of the spectrum have a winning bid associated with them. The electronic processor 102 excludes the spectral bins that have a winning bid associated with them.

The method 500 includes generating, with the electronic processor, a power spectrum matrix based on the amount of available spectrum that is determined, the power spectrum matrix being a logical aggregate of spectrum needs for all of the one or more radio nodes (at block 506). The logical aggregate corresponds to the maximum value of power spectrum density required by all radio nodes of a given network that need to use a given sub-band. For example, the electronic processor 102 generates a matrix of radio nodes associated with the GRN server 100 and available sub-bands of spectrum (as illustrated in FIG. 2) and then generates the power spectrum matrix by logically aggregating the matrix of radio nodes associated with the GRN server 100 and available sub-bands of spectrum (e.g., a 1 by 80 matrix instead of an M by 80 matrix).

The method 500 includes generating, with the electronic processor, a bid based on a need for spectrum access and a portion of the allotment of bidding credits (at block 508). For example, the electronic processor 102 uses the machine learning function 107 to generate a bid based on at least one of a load of the server or a spectrum interference pattern.

The method 500 includes controlling, with the electronic processor, a communication interface to transmit the power spectrum matrix that is generated and the bid that is generated to the one or more servers (at block 510). For example, the electronic processor 102 controls the communication interface 108 to transmit the power spectrum matrix that is generated and the bid that is generated to the GRN server 200.

The method 500 includes receiving, with the electronic processor, an external power spectrum matrix and an associated bid from each of the one or more servers (at block 512). For example, the electronic processor 102 receives an external power spectrum matrix and an associated bid from the GRN server 200.

The method 500 includes comparing, with the electronic processor, the bid that is generated to the associated bid that is received from the each of the one or more servers to determine whether the bid that is generated is a winning bid (at decision block 514). For example, the electronic processor 102 compares the bid that is generated to the associated bid that is received from the GRN server 200 to determine whether the bid that is generated is higher than the associated bid, and therefore, the winning bid.

In response to determining that the bid that is generated is a winning bid ("YES" at the decision block 514), the method 500 includes controlling, with the electronic processor, all of the one or more radio nodes to use the spectrum that is associated with the power spectrum matrix (at block 516). For example, the electronic processor 102 controls the communication interface 108 to transmit instructions to the radio nodes forming the wireless network 112. The instructions require each of the radio nodes to transmit using a specific spectrum sub-band from the power spectrum matrix that had a winning bid. In response to determining that the bid that is generated is not a winning bid ("NO" at the decision block 514), the method 500 proceeds to block 602 of FIG. 4 as described in greater detail below.

In some embodiments, when comparing the bid that is generated to the associated bid that is received from each of the one or more servers to determine whether the bid that is generated is the winning bid (at block 514), the method 500 also includes determining whether the one or more servers are farther than a predetermined distance from a location associated with the server. In response to determining that all of the one or more servers are farther than the predetermined distance from the location associated with the server, the method 500 includes excluding the associated bid that is received from the each of the one or more servers from the comparison to the bid that is generated. In response to determining that at least one server of the one or more servers is not farther than the predetermined distance from the location associated with the server, the method 500 includes not excluding the associated bid of at least one server of the one or more servers from the comparison to the bid that is generated.

Additionally, in some embodiments, the method 500 includes determining the need for spectrum access for a radio link based on one or more factors from a group consisting of a load of a transmitting node, a range between a transmitter and a receiver, a pathloss associated with the range, a capacity of the radio link, a spectrum interference pattern at a receiver node, and a need to protect other users of the spectrum.

Figure 4:
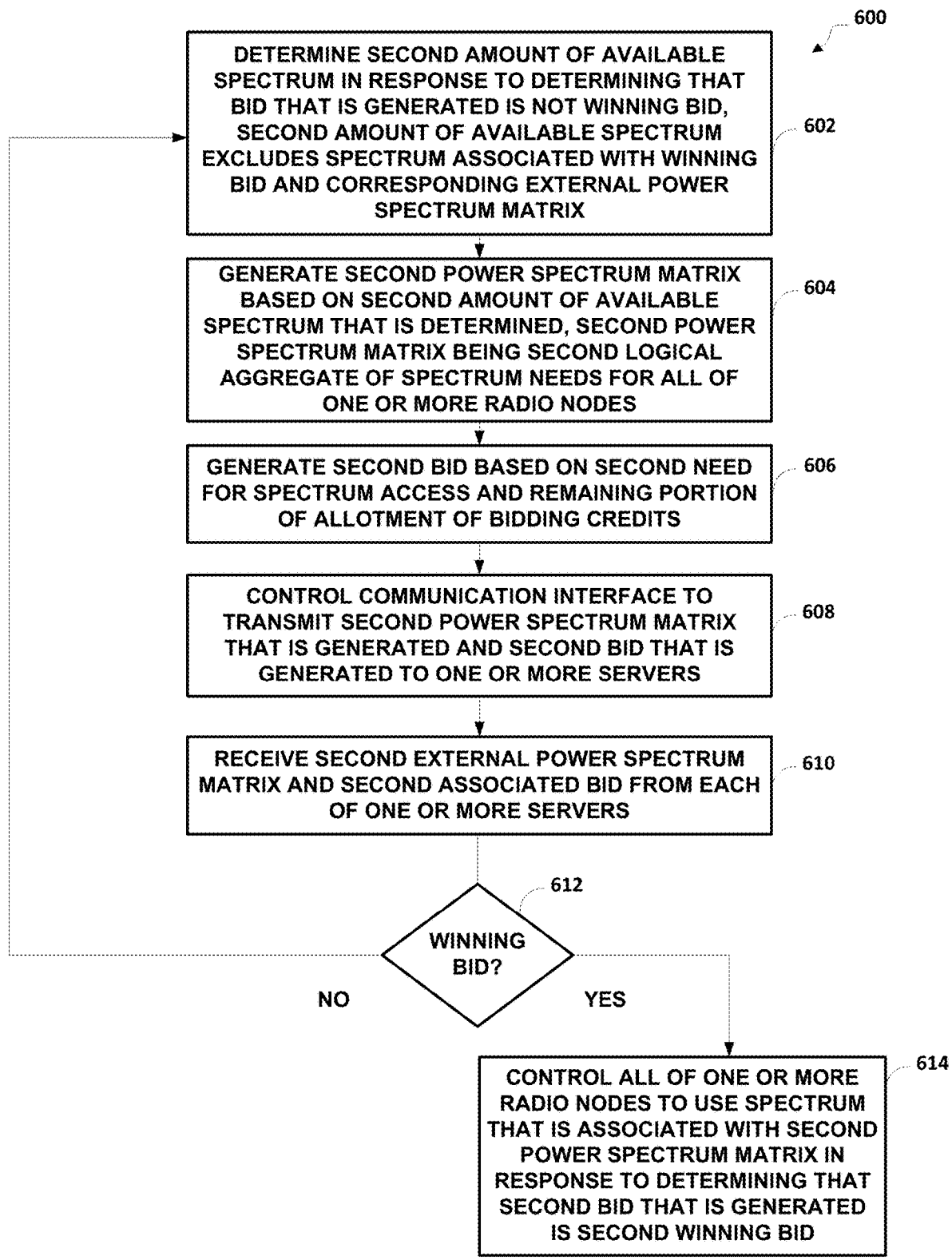
FIG. 4 is a flowchart illustrating a method for operating a server to control one or more radio nodes that is a continuation of the method of FIG. 3.

FIG. 4 is a flowchart illustrating a method 600 for operating a server to control one or more radio nodes that is in addition to the method 500. For ease of understanding, the method 600 is described with respect to the GRN server 100 of the wireless communication system 10 of FIG. 1 and FIG. 2. However, the method 500 is equally applicable to the GRN server 200 of FIG. 1 or any other additional servers of the wireless communication system 10.

The method 600 includes determining a second amount of available spectrum in response to determining that the bid that is generated is not the winning bid, the second amount of available spectrum excludes spectrum associated with the winning bid and corresponding external power spectrum matrix (at block 602). For example, the electronic processor 102 determines whether the spectral bins of the spectrum that have a winning bid in the first round and excludes the spectral bins in determining whether any spectral bins remain available for bidding. Additionally, when the electronic processor 102 determines that none of the spectral bins remain available for bidding, the electronic processor 102 resets to the beginning of the method 500 and waits for the next Epoch, blocking transmission from all its radio nodes for the present Epoch (the subject to the just concluded spectrum auction).

The method 600 includes generating a second power spectrum matrix based on the second amount of available spectrum that is determined, the second power spectrum matrix being a second logical aggregate of spectrum needs for all of the one or more radio nodes (at block 604). The second logical aggregate corresponds to the maximum value of power spectrum density required by all radio nodes of a given network that need to use a given sub-band. For example, the electronic processor 102 generates a second matrix of radio nodes associated with the GRN server 100 and available sub-bands of spectrum (as illustrated in FIG. 2) and then generates the second power spectrum matrix by logically aggregating the second matrix of radio nodes associated with the GRN server 100 and available sub-bands of spectrum (e.g., a 1 by 80 matrix instead of an M by 80 matrix).

The method 600 includes generating a second bid based on a second need for spectrum access and a remaining portion of the allotment of bidding credits (at block 606). For example, the electronic processor 102 uses the machine learning function 107 to generate a second bid based on at least one of a second load of the server or a spectrum interference pattern.

The method 600 includes controlling the communication interface to transmit the second power spectrum matrix that is generated and the second bid that is generated to one or more servers (at block 608). For example, the electronic processor 102 controls the communication interface 108 to transmit the second power spectrum matrix that is generated and the second bid that is generated to the GRN server 200.

The method 600 includes receiving a second external power spectrum matrix and a second associated bid from each of the one or more servers (at block 610). For example, the electronic processor 102 receives a second external power spectrum matrix and a second associated bid from the GRN server 200.

The method 600 includes comparing the second bid that is generated to the second associated bid that is received from the each of the one or more servers to determine whether the second bid that is generated is a second winning bid (at block 612). For example, the electronic processor 102 compares the second bid that is generated to the second associated bid that is received form the GRN server 200 to determine whether the second bid that is generated is higher than the second associated bid, and therefore, the second winning bid.

In response to determining that the second bid that is generated is a second winning bid ("YES" at the decision block 612), the method 600 includes controlling all of the one or more radio nodes to use the spectrum that is associated with the second power spectrum matrix in response to determining that the second bid that is generated is the second winning bid (at block 614). For example, the electronic processor 102 controls the communication interface 108 to transmit instructions to the radio nodes forming the wireless network 112. The instructions require each of the radio nodes to transmit using a specific spectrum sub-band from the second power spectrum matrix that had the second winning bid. In response to determining that the second bid that is generated is not a second winning bid ("NO" at the decision block 612), the method 600 proceeds back to block 602 of FIG. 4 as described in greater detail above.

The method 500 and the method 600 are repeated until all spectral bins have an associated winning bid or no more bids are received from any server. A server may only use spectrum that the server bids on, even if spectral bins remain unclaimed at the end of the auction. A server may bid zero credits to claim the unclaimed spectrum and if there is a tie with more than one server bidding zero credits, the tie is settled by repeating the last round. The method 500 is started at the beginning of each Epoch.

Thus, the present disclosure provides, among other things, a wireless communication system with a server having a dynamic spectrum sharing. Various features and advantages of the present disclosure are set forth in the following claims.

What is claimed is:

1. A first server, bidding for access rights to shared spectrum with dynamic spectrum sharing, comprising:
    a communication interface configured to
        communicate with one or more other servers via a backchannel, the one or more other servers also bidding for the access rights to the shared spectrum with the dynamic spectrum sharing, and
        control a terrestrial antenna to communicate with a one or more radio nodes that form a wireless network;
    a memory; and
    an electronic processor communicatively connected to the memory, the electronic processor configured to
        receive an allotment of bidding credits,
        determine an amount of available spectrum,
        generate a power spectrum matrix based on the amount of available spectrum that is determined, the power spectrum matrix being a logical aggregate of spectrum needs for all of the one or more radio nodes,
        generate a bid based on a need for spectrum access and using a portion of the allotment of bidding credits,
        control the communication interface to transmit the power spectrum matrix that is generated and the bid that is generated to the one or more other servers,
        receive an external power spectrum matrix and an associated bid from each of the one or more other servers,
        compare the bid that is generated to the associated bid that is received from the each of the one or more other servers to determine whether the bid that is generated by the first server is a winning bid, and
        responsive to determining that the bid that is generated by the first server is the winning bid, control all of the one or more radio nodes to use the spectrum that is associated with the power spectrum matrix.

2. The first server of claim 1, wherein the electronic processor is further configured to
    determine a second amount of available spectrum in response to determining that the bid that is generated is not the winning bid, the second amount of available spectrum excludes spectrum associated with the winning bid and corresponding external power spectrum matrix,
    generate a second power spectrum matrix based on the second amount of available spectrum that is determined, the second power spectrum matrix being a second logical aggregate of spectrum needs for all of the one or more radio nodes,
    generate a second bid based on a second need for spectrum access and a remaining portion of the allotment of bidding credits,
    control the communication interface to transmit the second power spectrum matrix that is generated and the second bid that is generated to the one or more other servers,
    receive a second external power spectrum matrix and a second associated bid from the each of the one or more other servers,
    compare the second bid that is generated to the second associated bid that is received from the each of the one or more other servers to determine whether the second bid that is generated is a second winning bid, and
    control all of the one or more radio nodes to use the spectrum that is associated with the second power spectrum matrix in response to determining that the second bid that is generated is the second winning bid.

3. The first server of claim 1, wherein, to compare the bid that is generated to the associated bid that is received from the each of the one or more other servers to determine whether the bid that is generated is the winning bid, the electronic processor is further configured to determine whether the one or more other servers are farther than a predetermined distance from a location associated with the first server.

4. The first server of claim 3, wherein responsive to determining that all of the one or more other servers are farther than the predetermined distance from the location associated with the first server, the electronic processor is further configured to exclude the associated bid that is received from the each of the one or more other servers from the comparison to the bid that is generated.

5. The first server of claim 3, wherein responsive to determining that at least one server of the one or more other servers is not farther than the predetermined distance from the location associated with the first server, the electronic processor is further configured to not exclude the associated bid of the at least one server of the one or more other servers from the comparison to the bid that is generated.

6. The first server of claim 1, wherein the electronic processor is further configured to determine the need for spectrum access for a radio link based on one or more factors from a group consisting of:
a load of a transmitting node,
a range between a transmitter and a receiver,
a pathloss associated with the range,
a capacity of the radio link,
a spectrum interference pattern at a receiver node, and
a need to protect other users of the spectrum.

7. A wireless communication system comprising:
a first one or more radio nodes configured to form first wireless network;
a second one or more radio nodes configured to form a second wireless network sharing the same spectrum as the first wireless network;
a first server configured to control the first one or more radio nodes, and the first server bidding for access rights to shared spectrum with dynamic spectrum sharing; and
a second server configured to control the second one or more radio nodes, the second server also bidding for the access rights to the shared spectrum with the dynamic spectrum sharing,
wherein the first server includes
a communication interface configured to
communicate with one or more other servers via a backchannel, the one or more other servers including the second server, and
control a terrestrial antenna to communicate with the first one or more radio nodes;
a memory; and
an electronic processor communicatively connected to the memory, the electronic processor configured to
receive an allotment of bidding credits,
determine a first amount of available spectrum,
generate a power spectrum matrix based on the first amount of available spectrum that is determined, the power spectrum matrix being a logical aggregate of spectrum needs for all of the first one or more radio nodes,
generate a bid based on a need for spectrum access and a portion of the allotment of bidding credits,
control the communication interface to transmit the power spectrum matrix that is generated and the bid that is generated to the one or more other servers,
receive an external power spectrum matrix and an associated bid from each of the one or more other servers,
compare the bid that is generated to the associated bid that is received from the each of the one or more other servers to determine whether the bid that is generated by the first server is a winning bid, and
responsive to determining that the bid that is generated by the first server is the winning bid, control all of the first one or more radio nodes to use the spectrum that is associated with the power spectrum matrix.

8. The wireless communication system of claim 7, wherein the electronic processor is further configured to
determine a second amount of available spectrum in response to determining that the bid that is generated is not the winning bid, the second amount of available spectrum excludes spectrum associated with the winning bid and corresponding external power spectrum matrix,
generate a second power spectrum matrix based on the second amount of available spectrum that is determined, the second power spectrum matrix being a second logical aggregate of spectrum needs for all of the first one or more radio nodes,
generate a second bid based on a second need for spectrum access and a remaining portion of the allotment of bidding credits,
control the communication interface to transmit the second power spectrum matrix that is generated and the second bid that is generated to the one or more other servers,
receive a second external power spectrum matrix and a second associated bid from the each of the one or more other servers,
compare the second bid that is generated to the second associated bid that is received from the each of the one or more other servers to determine whether the second bid that is generated is a second winning bid, and
control all of the first one or more radio nodes to use the spectrum that is associated with the second power spectrum matrix in response to determining that the second bid that is generated is the second winning bid.

9. The wireless communication system of claim 7, wherein, to compare the bid that is generated to the associated bid that is received from the each of the one or more other servers to determine whether the bid that is generated is the winning bid, the electronic processor is further configured to determine whether the one or more other servers are farther than a predetermined distance from a location associated with the first server.

10. The wireless communication system of claim 9, wherein responsive to determining that all of the one or more other servers are farther than the predetermined distance from the location associated with the first server, the electronic processor is further configured to exclude the associated bid that is received from the each of the one or more other servers from the comparison to the bid that is generated.

11. The wireless communication system of claim 9, wherein responsive to determining that at least one server of the one or more other servers is not farther than the predetermined distance from the location associated with the first server, the electronic processor is further configured to not exclude the associated bid of the at least one server of the one or more other servers from the comparison to the bid that is generated.

12. The wireless communication system of claim 7, wherein the electronic processor is further configured to determine the need for spectrum access for a radio link based on one or more factors from a group consisting of:
a load of a transmitting node,
a range between a transmitter and a receiver,
a pathloss associated with the range,
a capacity of the radio link,
a spectrum interference pattern at a receiver node, and
a need to protect other users of the spectrum.

13. The wireless communication system of claim 7, wherein the second server includes
a second communication interface configured to
communicate with a second one or more servers via the backchannel, the second one or more servers including the first server, and
control a second terrestrial antenna to communicate with the second one or more radio nodes;
a second memory; and
a second electronic processor communicatively connected to the second memory, the second electronic processor configured to
receive a second allotment of bidding credits,
determine the first amount of available spectrum,
generate a second power spectrum matrix based on the first amount of available spectrum that is determined, the second power spectrum matrix being a second logical aggregate of spectrum needs for all of the second one or more radio nodes,
generate a second bid based on a second need for spectrum access and a portion of the second allotment of bidding credits,
control the second communication interface to transmit the second power spectrum matrix that is generated and the second bid that is generated to the second one or more servers,
receive a second external power spectrum matrix and a second associated bid from each of the second one or more servers,
compare the second bid that is generated to the second associated bid that is received from the each of the second one or more servers to determine whether the second bid that is generated is the winning bid, and
control all of the second one or more radio nodes to use the spectrum that is associated with the second power spectrum matrix in response to determining that the second bid that is generated is the winning bid.

14. A method for operating a first server to control one or more radio nodes, the first server bidding for access rights to shared spectrum with dynamic spectrum sharing, the method comprising:
receiving, with an electronic processor of the first server, an allotment of bidding credits;
determining, with the electronic processor, an amount of available spectrum;
generating, with the electronic processor, a power spectrum matrix based on the amount of available spectrum that is determined, the power spectrum matrix being a logical aggregate of spectrum needs for all of the one or more radio nodes;
generating, with the electronic processor, a bid based on a need for spectrum access and using a portion of the allotment of bidding credits;
controlling, with the electronic processor, a communication interface to transmit the power spectrum matrix that is generated and the bid that is generated to one or more other servers also bidding for the access rights to the shared spectrum with the dynamic spectrum sharing;
receiving, with the electronic processor, an external power spectrum matrix and an associated bid from each of the one or more other servers;
comparing, with the electronic processor, the bid that is generated to the associated bid that is received from the each of the one or more other servers to determine whether the bid that is generated by the first server is a winning bid; and
responsive to determining that the bid that is generated by the first server is the winning bid controlling, with the electronic processor, all of the one or more radio nodes to use the spectrum that is associated with the power spectrum matrix.

15. The method of claim 14, further comprising:
determining a second amount of available spectrum in response to determining that the bid that is generated is not the winning bid, the second amount of available spectrum excludes spectrum associated with the winning bid and corresponding external power spectrum matrix;
generating a second power spectrum matrix based on the second amount of available spectrum that is determined, the second power spectrum matrix being a second logical aggregate of spectrum needs for all of the one or more radio nodes;
generating a second bid based on a second need for spectrum access and a remaining portion of the allotment of bidding credits;
controlling the communication interface to transmit the second power spectrum matrix that is generated and the second bid that is generated to the one or more other servers;
receiving a second external power spectrum matrix and a second associated bid from each of the one or more other servers;
comparing the second bid that is generated to the second associated bid that is received from the each of the one or more other servers to determine whether the second bid that is generated is a second winning bid; and
controlling all of the one or more radio nodes to use the spectrum that is associated with the second power spectrum matrix in response to determining that the second bid that is generated is the second winning bid.

16. The method of claim 14, wherein comparing the bid that is generated to the associated bid that is received from the each of the one or more other servers to determine whether the bid that is generated is the winning bid further includes determining whether the one or more other servers are farther than a predetermined distance from a location associated with the first server.

17. The method of claim 16, further comprising excluding the associated bid that is received from the each of the one or more other servers from the comparison to the bid that is generated in response to determining that all of the one or more other servers are farther than the predetermined distance from the location associated with the first server.

18. The method of claim 16, further comprising not excluding the associated bid of at least one of the one or more other servers from the comparison to the bid that is generated in response to determining that at least one server of the one or more other servers is not farther than the predetermined distance from the location associated with the first server.

19. The method of claim 14, further comprising determining the need for spectrum access for a radio link based on one or more factors from a group consisting of:
- a load of a transmitting node,
- a range between a transmitter and a receiver,
- a pathloss associated with the range,
- a capacity of the radio link,
- a spectrum interference pattern at a receiver node, and
- a need to protect other users of the spectrum.

* * * * *